(12) United States Patent
Chen et al.

(10) Patent No.: US 12,481,138 B2
(45) Date of Patent: Nov. 25, 2025

(54) LENS MODULE, CAMERA MODULE, AND TERMINAL

(71) Applicant: HUAWEI TECHNOLOGIES CO., LTD., Guangdong (CN)

(72) Inventors: Shi Chen, Dongguan (CN); Kuni Lee, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 387 days.

(21) Appl. No.: 18/174,696

(22) Filed: Feb. 27, 2023

(65) Prior Publication Data

US 2023/0221537 A1 Jul. 13, 2023

Related U.S. Application Data

(63) Continuation of application No. PCT/CN2021/109802, filed on Jul. 30, 2021.

(30) Foreign Application Priority Data

Aug. 31, 2020 (CN) .......................... 202010901470.0

(51) Int. Cl.
*G02B 17/08* (2006.01)
*G02B 7/02* (2021.01)
(Continued)

(52) U.S. Cl.
CPC ............ *G02B 17/086* (2013.01); *G02B 7/021* (2013.01); *G02B 13/0065* (2013.01); *H04M 1/0264* (2013.01); *H04N 23/50* (2023.01)

(58) Field of Classification Search
CPC .. G02B 17/086; G02B 7/021; G02B 13/0065; H04M 1/0264; H04N 23/50
(Continued)

(56) References Cited

U.S. PATENT DOCUMENTS 6,169,637 B1 * 1/2001 Tsunashima ......... G02B 17/086
359/732
8,896,938 B2 * 11/2014 Hatakeyama ...... G02B 17/0856
359/557
(Continued)

FOREIGN PATENT DOCUMENTS

CN 103969800 A 8/2014
CN 105492934 A 4/2016
(Continued)

OTHER PUBLICATIONS

Extended European Search Report for Application No. 21860049.2 dated Feb. 27, 2024, 8 pages.
(Continued)

*Primary Examiner* — Sharrief I Broome

(57) ABSTRACT

This application provides a lens module. The lens module includes a first lens module and a second lens module, and the first lens module and the second lens module are arranged along an optical axis. The first lens module is configured to implement a long focal length, and the second lens module is configured to implement focusing. During specific disposition, the first lens module includes a first lens, and a light incident side surface of the first lens includes a light transmission region and a first reflection region; a light outgoing side surface of the first lens includes a second reflection region and a light outgoing region; and the first reflection region and the second reflection region are configured to refract light incident into the first lens. The second lens module includes at least one second lens, and the at least one second lens is a focusing lens.

20 Claims, 9 Drawing Sheets

(51) Int. Cl.
  *G02B 13/00* (2006.01)
  *H04M 1/02* (2006.01)
  *H04N 23/50* (2023.01)
(58) Field of Classification Search
  USPC .......................................................... 359/731
  See application file for complete search history.

(56) References Cited

U.S. PATENT DOCUMENTS

| | | | | |
|---|---|---|---|---|
| 2016/0282580 A1* | 9/2016 | Koyama | ................ | H04N 23/57 |
| 2017/0205605 A1* | 7/2017 | Hsu | ................... | G02B 27/0025 |
| 2017/0371126 A1* | 12/2017 | Takehana | ............. | G03B 21/142 |
| 2019/0278045 A1* | 9/2019 | Manushi | ................ | G02B 7/021 |
| 2020/0158980 A1* | 5/2020 | Wang | ..................... | G02B 7/023 |
| 2020/0409142 A1* | 12/2020 | Feng | ...................... | G02B 7/021 |
| 2021/0018715 A1* | 1/2021 | Fujii | ...................... | G02B 13/18 |
| 2021/0223499 A1* | 7/2021 | Feng | ...................... | G02B 5/223 |

FOREIGN PATENT DOCUMENTS

| | | |
|---|---|---|
| CN | 107885010 A | 4/2018 |
| CN | 108254859 A | 7/2018 |
| CN | 109194859 A | 1/2019 |
| CN | 109239889 A | 1/2019 |
| CN | 110515189 A | 11/2019 |
| CN | 110888216 A | 3/2020 |
| CN | 111025515 A | 4/2020 |
| EP | 0747744 B1 | 8/2002 |
| EP | 3249439 A1 * | 11/2017 ........... G02B 13/001 |
| JP | H11316343 A | 11/1999 |
| JP | 2004157241 A | 6/2004 |
| KR | 20190090147 A | 8/2019 |
| TW | 201621396 A | 6/2016 |
| WO | 2017107910 A1 | 6/2017 |
| WO | 2020164406 A1 | 8/2020 |

OTHER PUBLICATIONS

Japanese Office Action for Application No. 2023-513586 dated Mar. 29, 2024, 8 pages.

Chinese Office Action for Application No. 202110989156 dated Jun. 15, 2022, 8 pages.

Chinese Office Action for Application No. 202110989156 dated Aug. 22, 2023, 9 pages.

* cited by examiner

LENS MODULE, CAMERA MODULE, AND TERMINAL

CROSS-REFERENCE TO RELATED APPLICATIONS

This application is a continuation of International Application No. PCT/CN2021/109802, filed on Jul. 30, 2021, which claims priority to Chinese Patent Application No. 202010901470.0, filed on Aug. 31, 2020. The disclosures of the aforementioned applications are hereby incorporated by reference in their entireties.

TECHNICAL FIELD

This application relates to the field of camera technologies, and in particular, to a lens module, a camera module, and a terminal.

BACKGROUND

A long-focus lens module is very helpful for photographing a distant scenario, for example, taking a concert or landscape photo. The distant scenario can be photographed through the long-focus lens module on a sensor without mechanical movement. Within a same shooting distance, compared with a normal lens module, a specific local part of a same scenery can be photographed to be larger and clearer through the long-focus lens module. The long-focus lens module enriches image functions of a mobile phone and improves imaging quality, greatly enlarges a use scenario and creation space of a user, helps the user break through space and physical limitations to get closer to the world, brings more interesting operations, and brings more convenience and fun to life.

In the conventional technology, a long-focus lens module uses optical zooming, and the optical zooming is implemented through an optical lens module. A zooming manner of the optical zooming mainly depends on a focal length of the lens module, and a scenery is zoomed in and zoomed out by moving a camera lens. This is referred to as the optical zooming. Ultra-distance zoom imaging actually has shooting difficulty to some extent. When the long-focus lens module is used in a mobile phone, a camera includes a plurality of small lenses due to a body design of the mobile phone. In addition, with thinning development of a mobile phone, a thickness of an internal space of the mobile phone is extremely thin, and there is no physical space for stacking a long-focus lens module. Consequently, in the conventional technology, the long-focus lens module used in the mobile phone cannot adapt to a requirement of the mobile phone.

SUMMARY

This application provides a lens module, a camera module, and a terminal, to reduce a size of the lens module and improve adaptability of the lens module.

According to a first aspect, a lens module is provided. The lens module includes a first lens module and a second lens module, the first lens module and the second lens module are arranged along an optical axis, the first lens module is close to an object side, and the second lens module is close to an image side. The first lens module is configured to implement a long focal length, and the second lens module is configured to implement focusing. During specific disposition, the first lens module includes a first lens, and a light incident side surface of the first lens includes a light transmission region and a first reflection region; a light outgoing side surface of the first lens includes a second reflection region and a light outgoing region; and the first reflection region and the second reflection region are configured to refract light incident into the first lens from the light transmission region. The second lens module includes at least one second lens, and the at least one second lens is a focusing lens. During disposition, the at least one second lens and the first lens are arranged along the optical axis. In the foregoing technical solution, a light path is folded back through the first lens, to implement effect of a long-focus lens module. In addition, because the light path is folded back, an upright lens module with a small size may be used, and a size of a camera module is reduced, so that the camera module can adapt to thinning development of a terminal.

In a specific implementable solution, the first reflection region is located at a center position of the light incident side surface, and the light transmission region surrounds the first reflection region; and the light outgoing region is located at a center position of the light outgoing side surface, and the second reflection region is disposed around the light outgoing region. The first reflection region is disposed opposite to the light outgoing region, and the light transmission region is disposed opposite to the second reflection region, so that the light can be refracted in the first lens.

In a specific implementable solution, the light transmission region is a plane; and the first reflection region is a concave spherical region. The light is conveniently refracted to the light outgoing region by using the concave spherical region.

In a specific implementable solution, the light outgoing side surface is a convex spherical surface. By using the spherical surface, the light is conveniently reflected to the first reflection region by the second reflection region, and is conveniently converged on a light outgoing side.

In a specific implementable solution, a reflection film layer is separately attached to the first reflection region and the second reflection region. A reflection effect is improved by using the reflection film layer.

In a specific implementable solution, the first lens module further includes a first lens barrel, and the first lens is fastened in the first lens barrel; and the second lens module further includes a second lens barrel, there are a plurality of second lenses, and the plurality of second lenses are arranged along the optical axis and are fastened in the second lens barrel. The lenses are supported by the separately disposed lens barrels. In addition, the lenses may be separately disposed in different lens barrels as required.

In a specific implementable solution, the first lens module further includes a first lens barrel, the first lens is fastened in the first lens barrel, the first lens module further includes at least one third lens fastened in the first lens barrel, and the at least one third lens is a focusing lens; and the second lens module further includes a second lens barrel, there is one second lens, and the second lens is fastened in the second lens barrel. The lenses are supported by the separately disposed lens barrels. In addition, the lenses may be separately disposed in different lens barrels as required.

In a specific implementable solution, the lens module further includes a bracket, and at least one of the first lens module and the second lens module is capable of sliding relative to the bracket in an optical axis direction. The first lens module and the second lens module are supported by the bracket.

In a specific implementable solution, the second lens module is fixedly connected to the bracket, and the first lens module is connected to the bracket by using a first elastic"

member. Focusing is implemented in a manner in which one lens module is fixed and the other lens module slides.

In a specific implementable solution, the first lens module is connected to the bracket by using a first elastic member; and the second lens module is connected to the bracket by using a second elastic member. Focusing is implemented in a manner in which the two lenses may be separately slidably connected to the bracket.

In a specific implementable solution, a shaft extending in the optical axis direction is disposed in the bracket; and the first lens module and the second lens module are separately slidably assembled on the shaft. Focusing is implemented in a manner in which the two lenses may be separately slidably connected to the bracket.

In a specific implementable solution, the lens module further includes a driving mechanism, and the driving mechanism is configured to drive the first lens module or the second lens module to move, to implement focusing.

In a specific implementable solution, the driving mechanism may be a focusing AF (Auto Focus, auto focus) driving motor, and different driving mechanisms are used to drive the lens module for focusing.

According to a second aspect, a camera module is provided. The camera module includes a base and the lens module that is in any one of the foregoing items and that is connected to the base. In the foregoing technical solution, a light path is folded back through the first lens, to implement effect of a long-focus lens module. In addition, because the light path is folded back, an upright lens module with a small size may be used, and a size of the camera module is reduced, so that the camera module can adapt to thinning development of a terminal.

In a specific implementable solution, the base is connected to the bracket by using a third elastic member; and the camera module further includes an image stabilization motor that compensates for jittering of the lens module. An image stabilization effect of the camera module is improved through cooperation between the third elastic member and the image stabilization motor.

In a specific implementable solution, the third elastic member is a spring or a suspension wire. The spring or the suspension wire can support the bracket.

According to a third aspect, a terminal is provided. The terminal includes a housing and the camera module that is in any one of the foregoing items and that is disposed in the housing. In the foregoing technical solution, a light path is folded back through the first lens, to implement effect of a long-focus lens module. In addition, because the light path is folded back, an upright lens module with a small size may be used, and a size of the camera module is reduced, so that the camera module can adapt to thinning development of the terminal.

DESCRIPTION OF EMBODIMENTS

The following further describes in detail embodiments of this application with reference to the accompanying drawings.

Figure 1:
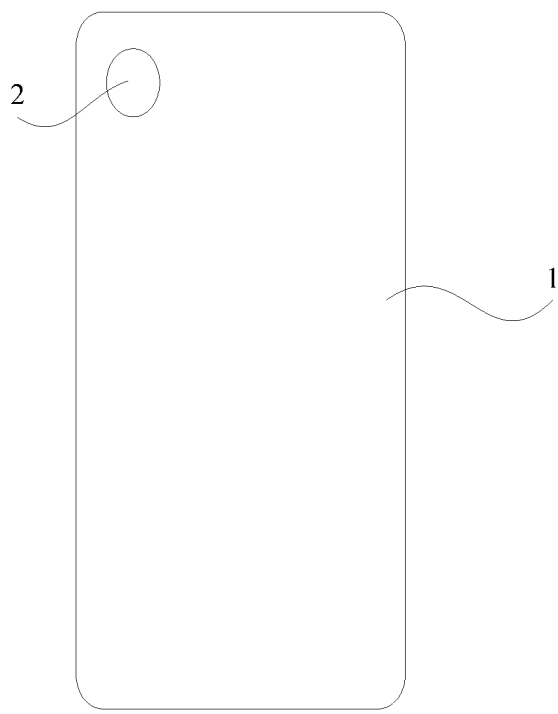
FIG. 1 is a schematic diagram of an application scenario of a camera module.

To facilitate understanding of a lens module provided in embodiments of this application, an application scenario of the lens module is first described. The lens module provided in embodiments of this application is used in a camera module, and the lens module is configured to converge light to an image signal processor of the camera module, to photograph an object. The camera module is used in a terminal, for example, a common terminal such as a notebook computer, a tablet computer, or a mobile phone. FIG. 1 is a schematic diagram of a structure in which a camera module 2 is fastened to a mobile phone, where the camera module 2 is fastened in a housing 1 of the mobile phone, and a lens module of the camera module 2 is exposed outside the housing 1. When being used, the camera module 2 may be configured to implement a video recording or shooting function of the mobile phone. However, due to the gradual thinning of terminals developed over time, a size of the camera module 2 is limited, and a long-focus lens module in the conventional technology cannot adapt to the thinning of the mobile phone. Therefore, embodiments of this application provide a lens module for reducing the size of the camera module 2. The following describes a structure of the lens module in detail with reference to specific accompanying drawings.

Figure 2:
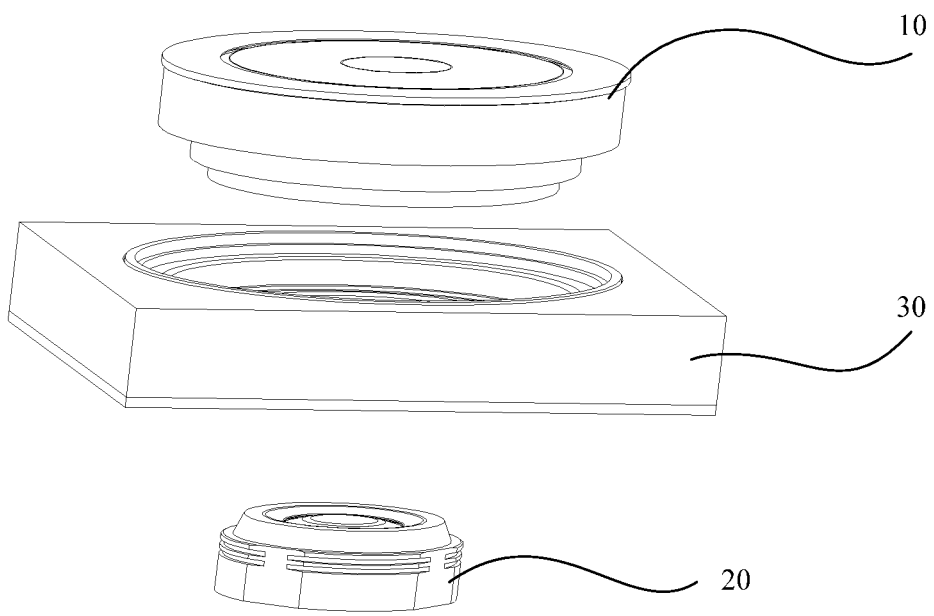
FIG. 2 is a schematic diagram of decomposition of a lens module according to an embodiment of this application.

FIG. 2 is a schematic diagram of decomposition of a lens module 100 according to an embodiment of this application. The lens module 100 provided in this embodiment of this application is used in an upright camera module.

The lens module 100 mainly includes a first lens module 10, a second lens module 20, and a bracket 30 configured to support the first lens module 10 and the second lens module 20. The first lens module 10 and the second lens module 20 are arranged along an optical axis, the first lens module 10 is close to an object side, and the second lens module 20 is close to an image side. It should be understood that the bracket 30 is a specific implementation form of supporting the first lens module 10 and the second lens module 20. In the lens module 100 provided in this embodiment of this application, another structure, for example, a housing or another similar structure, may alternatively be used to support the first lens module 10 and the second lens module 20.

During shooting, light successively passes through the first lens module 10 and the second lens module 20, and the light may be refracted through the first lens module 10, to implement a long-focus effect of the lens module 100; and the light is focused through the second lens module 20, to implement a focusing effect of the lens module 100.

Figure 3:
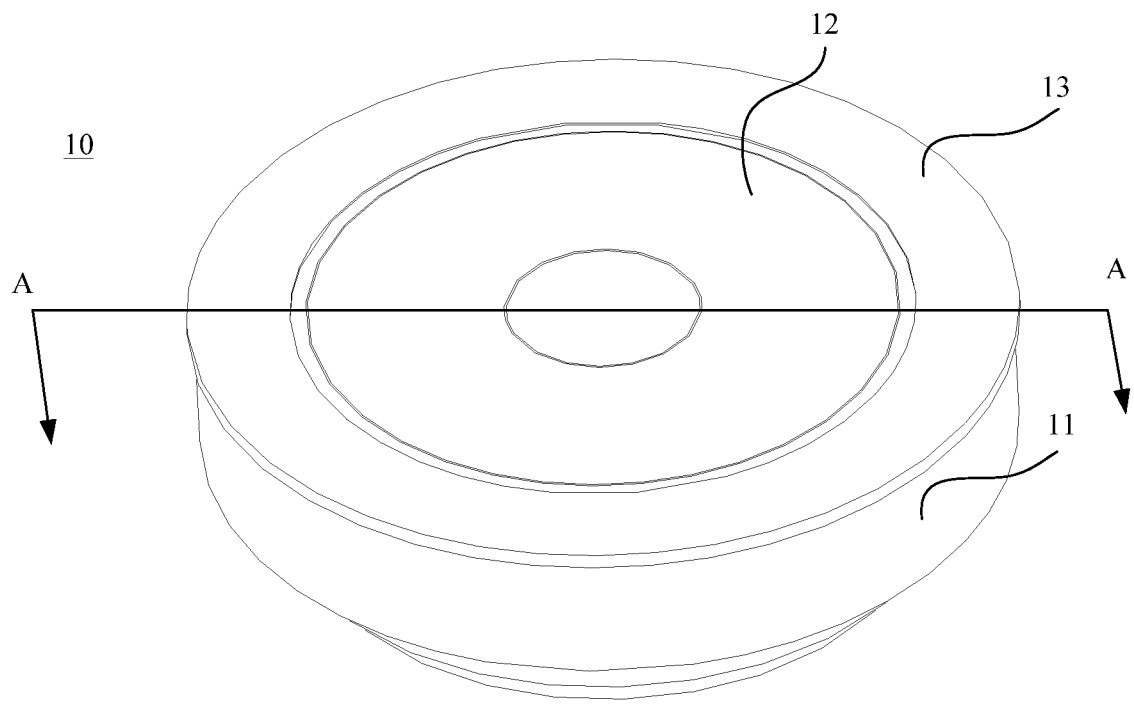
FIG. 3 is a schematic diagram of a structure of a first lens module according to an embodiment of this application.

FIG. 3 is a schematic diagram of a structure of the first lens module 10. The first lens module 10 includes a first lens 12, a first lens barrel 11, and a cover plate 13. The first lens barrel 11 serves as a support structure of the first lens 12, and the first lens 12 may be fastened in the first lens barrel 11. In addition, both ends of the first lens barrel 11 are opened, so that the light can pass through the first lens barrel 11. The cover plate 13 is covered on an opening at one end of the first lens barrel 11, and is fixedly connected to the end of the first lens barrel 11, to cooperate with the first lens barrel 11 to limit the first lens 12 in the first lens barrel 11.

In an optional solution, the first lens barrel 11 may be a structural device made of a plastic material or another molding material. The first lens barrel 11 may support and fasten the first lens 12, reduce stress of the first lens 12, and ensure position precise and positioning precise of the first lens 12.

In an optional solution, the first lens barrel 11 uses a cylindrical structure, to reduce a space occupied by the first lens module 10. It should be understood that the first lens barrel 11 in the example in FIG. 3 is merely an example. When the first lens barrel 11 is specifically disposed, a structure of another shape, for example, a cylindroid shape or a square cylinder shape, may alternatively be used.

Figure 4:
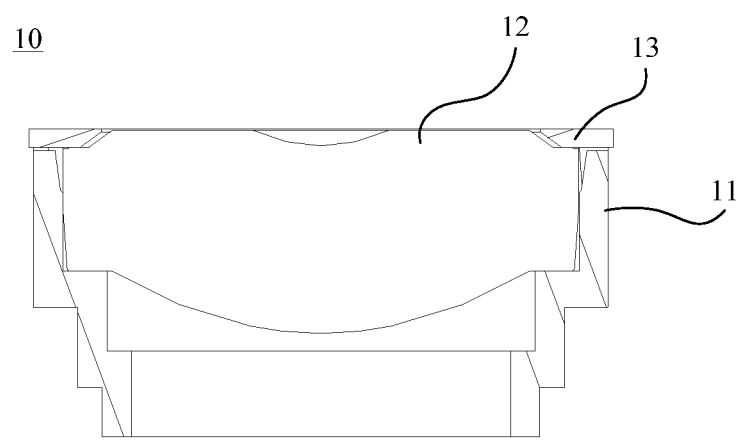
FIG. 4 is a sectional view of a position A-A in FIG. 3.

FIG. 4 is a sectional view of a position A-A in FIG. 3. A cavity in the first lens barrel 11 is a stepped cavity. For ease of description, the two ends of the first lens barrel 11 are respectively defined as a first end and a second end, where the first end is one end that is of the first lens barrel 11 and that is close to the object side, and the second end is one end that is of the first lens barrel 11 and that is close to the image side (namely, one end close to the second lens module). An inner wall in the first lens barrel 11 changes in a stepped manner in a direction from the first end to the second end, and a size of the inner wall gradually decreases, to form the cavity that changes in the stepped manner.

When being assembled, the first lens 12 is fastened at a position that is in the cavity and that is close to the first end. A sidewall of the first lens 12 is fixedly connected to a sidewall of the first lens barrel 11. The cover plate 13 is covered on the first end of the first lens barrel 11, and cooperates with a stepped surface on the inner wall of the first lens barrel 11 to limit the first lens 12. It should be understood that a through hole that cooperates with a light incident surface of the first lens 12 is disposed on the cover plate 13, so that the light can be irradiated to the first lens 12. In addition, a region that is of the first lens 12 and that is shielded by the cover plate 13 is a non-functional region of the first lens 12, and does not affect a function of the first lens 12.

In an optional solution, the first lens 12 may be fixedly connected to the first lens barrel 11 through interference fit. Alternatively, the first lens 12 may be fixedly bonded in the first lens barrel 11 by using glue, resin, or another adhesive material, or the first lens 12 may be directly molded and fastened in a manner of performing secondary molding in an injection molding die cavity.

In an optional solution, an outer wall of the first lens barrel 11 also changes in a stepped manner, and a trend of the stepped change is the same as that of the inner wall of the first lens barrel 11.

Figure 5:
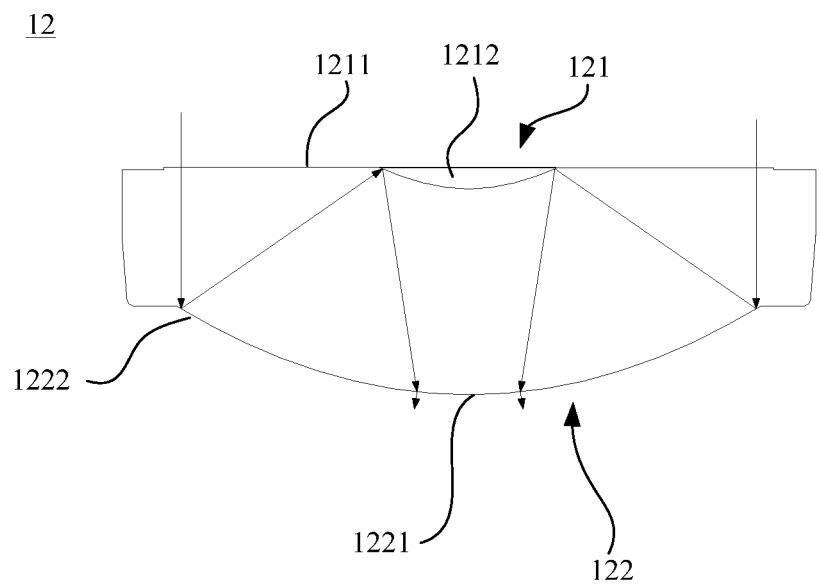
FIG. 5 is a schematic diagram of a structure of a first lens.

FIG. 5 is a schematic diagram of a structure of the first lens 12. The first lens 12 uses a circular lens. However, the first lens 12 provided in this embodiment of this application is not limited to the circular lens shown in FIG. 5, but may alternatively be an elliptical lens, a rectangular lens, or a lens of another shape.

The first lens 12 has two opposite surfaces, which are respectively a light incident side surface 121 and a light outgoing side surface 122. The light incident side surface 121 is a surface that is of the first lens 12 and that is close to the object side, and the light outgoing side surface 122 is a surface that is of the first lens 12 and that is close to the image side. When the first lens 12 is used, the light may be incident into the first lens 12 through the light incident side surface 121, and be emergent from the first lens 12 through the light outgoing side surface 122.

The light incident side surface 121 and the light outgoing side surface 122 are separately divided into different regions based on functions. For example, the light incident side surface 121 is divided into a light transmission region 1211 and a first reflection region 1212; and the light outgoing side surface 122 is divided into a light outgoing region 1221 and a second reflection region 1222. The light transmission region 1211 and the light outgoing region 1221 are respectively regions through which the light is incident into and emergent from the first lens 12. The first reflection region 1212 and the second reflection region 1222 are regions configured to fold back a path of the light propagated in the first lens 12.

When different regions of the light incident side surface 121 and the light outgoing side surface 122 are specifically disposed, in an optional solution, the first reflection region 1212 is located at a center position of the light incident side surface 121, and the light transmission region 1211 surrounds the first reflection region 1212. The light outgoing region 1221 is located at a center position of the light outgoing side surface 122, and the second reflection region 1222 is disposed around the light outgoing region 1221. Therefore, in an optical axis direction, the light transmission region 1211 is disposed opposite to the second reflection region 1222, and the light outgoing region 1221 is disposed opposite to the first reflection region 1212. In addition, a reflective surface (the first reflection region 1212) is disposed at a center of a light path. In this case, the light incident into the first lens 12 is in a ring shape, so that a disc of confusion is in a ring shape when defocussing is performed by the lens module during shooting. In this way, final imaging quality is good. In addition, chromatic aberration is not formed, and excellent picture imaging quality can be implemented.

A straight line with an arrow in FIG. 5 represents a light path. When the light is irradiated to the light incident side surface 121, the light is incident into the first lens 12 from only the light transmission region 1211, and the first reflection region 1212 is a non-transparent region through which the light cannot pass. The light incident into the first lens 12 is reflected to the first reflection region 1212 by the second reflection region 1222, then is reflected to the light outgoing region 1221 by the first reflection region 1212, and is finally emergent from the light outgoing region 1221. The transmitted light enters an air layer through refraction, and enters the second lens module in the optical axis direction. It can be seen from the light path shown in FIG. 5 that when the light is propagated in the first lens 12, the light does not directly reach an image signal processor when passing through the first lens 12 due to a principle of light refraction, but reaches the image signal processor after being reflected for two times. Therefore, a length of the first lens module can be shortened, a volume and a weight are minimized, and costs are also reduced.

When the first reflection region 1212 and the second reflection region 1222 are specifically formed, a reflection film layer may be separately attached to the first reflection region 1212 and the second reflection region 1222. A reflective surface of the reflection film layer faces an inner part of the lens, to reflect the light in the first lens 12. It should be understood that attachment of the reflection film layer is merely a specific example of forming the first reflection region 1212 and the second reflection region 1222. In this embodiment of this application, the reflection regions may alternatively be formed in another manner, for example, a reflection material is sprayed to form the first reflection region 1212 and the second reflection region 1222. In addition, for the first lens 12, a dispersive refractive surface is replaced with a non-dispersive reflective surface (the first reflection region 1212 and the second reflection region 1222), to better control dispersion.

In an optional solution, the light transmission region 1211 is a plane for light incident. It should be understood that the light transmission region 1211 may alternatively use another surface. For example, the light transmission region 1211 may alternatively use a convex arc-shaped surface, a concave arc-shaped surface, or another type of surface, provided that the light incident into the first lens 12 from the light transmission region 1211 can be propagated to the second reflection region 1222.

In an optional solution, the first reflection region 1212 is a concave spherical region of the light incident side surface 121. As shown in FIG. 5, the first reflection region 1212 is a spherical region recessed in the first lens 12. When the spherical region is used, the light reflected from the second reflection region 1222 to the first reflection region 1212 may have different incident angles, and the light may be converged to the light outgoing region 1221 by using the spherical region of the first reflection region 1212. It should be understood that the first reflection region 1212 is not limited to the spherical region shown in FIG. 5, but may alternatively use another type of surface that can converge the light. For example, the first reflection region 1212 may alternatively be a different type of surface such as a conical surface, an elliptical surface, or a parabolic surface. Similarly, a convergence effect on the light can be implemented.

In an optional solution, the light outgoing side surface 122 is a convex spherical surface. When the convex spherical surface is used for the light outgoing side surface 122, a surface that is of the second reflection region 1222 and that is configured to reflect light is a concave surface, and the concave surface faces the first reflection region 1212, to reflect, to the first reflection region 1212, the light irradiated to the second reflection region 1222 from the light transmission region 1211. In addition, the light outgoing region 1221 is a spherical surface, so that the light reflected by the first reflection region 1212 is re-converged. It should be understood that the spherical surface of the light outgoing side surface 122 is a specific example of this application, and the light outgoing side surface 122 may alternatively use another type of surface. For example, the light outgoing side surface 122 may alternatively use a tapered surface, and both the second reflection region 1222 and the light outgoing region 1221 are of planar structures. Alternatively, the light outgoing side surface 122 may alternatively use a combined surface, for example, the second reflection region 1222 is a ring-shaped plane, and the plane is inclined relative to the optical axis, to reflect the light to the first reflection region 1212; and the light outgoing region 1221 uses a spherical surface.

It should be understood that a ratio of the first reflection region 1212 to the light transmission region 1211 and a ratio of the second reflection region 1222 to the light outgoing region 1221 are not specifically limited in this embodiment of this application. When the foregoing regions are specifically disposed, a proportion relationship of the foregoing regions may be used, provided that the light path shown in FIG. 5 can be implemented.

Figure 6:
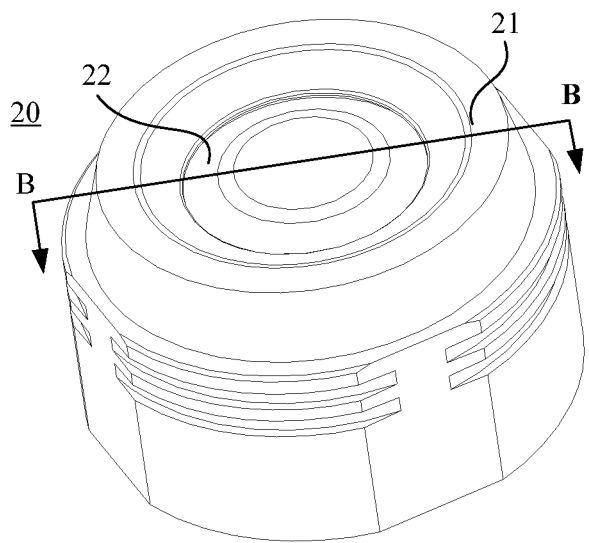
FIG. 6 is a schematic diagram of a structure of a second lens module according to an embodiment of this application.

FIG. 6 is a schematic diagram of a structure of the second lens 22 according to an embodiment of this application. Functions of the second lens module 20 are to further converge imaging light converged from the first lens module, adjust an imaging focal length, reduce chromatic aberration, distortion, and aberration, adjust and improve imaging quality, reduce field of view curvature under each field of view, and ensure imaging quality on the image signal processor. The following describes the structure of the second lens module 20 in detail with reference to FIG. 6.

The second lens module 20 includes a second lens 22 and a second lens barrel 21. The second lens barrel 21 is used as a support structure of the second lens 22. The second lens 22 may be fastened in the second lens barrel 21 during assembly. In addition, both ends of the second lens barrel 21 are opened, so that the light can pass through a cavity in the second lens barrel 21.

A material of the second lens barrel 21 may be a plastic material or another easily molded material. This is not specifically limited in this embodiment of this application.

A material of the second lens 22 is a common lens material, for example, an optical white plastic material or an optical glass material. This is not specifically limited in this embodiment of this application.

Figure 7:
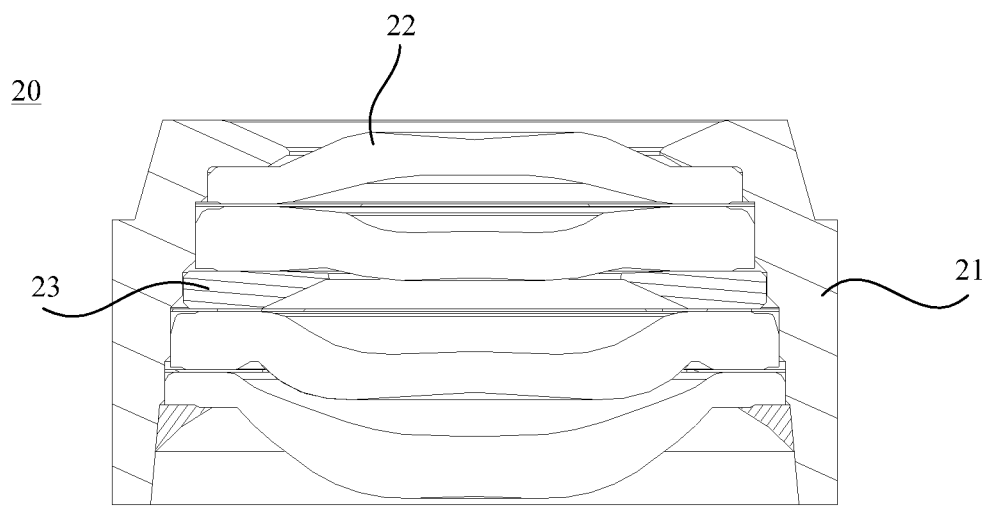
FIG. 7 is a sectional view of a position B-B in FIG. 6.

FIG. 7 is a sectional view of a position B-B in FIG. 6. The cavity in the second lens barrel 21 is a stepped cavity. For ease of description, the two ends of the second lens barrel 21 are respectively defined as a third end and a fourth end, where the third end is one end that is of the second lens barrel 21 and that is close to the object side, and the fourth end is one end that is of the second lens barrel 21 and that is close to the image side (namely, one end close to the image signal processor). An inner wall in the second lens barrel 21 changes in a stepped manner in a direction from the third end to the fourth end, and a size of the inner wall gradually increases, to form the cavity that changes in the stepped manner.

In an optional solution, the second lens 22 may be fixedly connected to a sidewall of the second lens barrel 21 through interference fit; or a sidewall of the second lens 22 is bonded to the sidewall of the second lens barrel 21 by using adhesive.

In an optional solution, there are four second lenses 22, the four second lenses 22 are arranged in the second lens barrel 21 along the optical axis, and the four lenses each may be a spherical lens or an aspherical lens as required. During specific disposition, a specific structure and a size of each lens are not specifically limited in this embodiment of this application, provided that the four lenses can implement focusing. It should be understood that the four second lenses 22 shown in FIG. 7 are merely a specific example. A quantity of second lenses 22 provided in this embodiment of this application is not limited to the four lenses shown in FIG. 7, and any quantity of second lenses 22, for example, two, three, five, or six second lenses 22, may alternatively be selected, provided that, after the second lenses 22 are combined, the imaging focal length can be adjusted, the chromatic aberration, the distortion, and the aberration can be reduced, the imaging quality can be adjusted and improved, and the field of view curvature under each field of view can be reduced.

In an optional solution, the second lens module 20 further includes a gasket 23, and the gasket 23 is configured to adjust a spacing between the second lenses 22. The gasket 23 may be disposed between different second lenses 22, so that a thickness of the gasket 23 can be adjusted based on an actual requirement. This is not specifically limited herein.

In an optional solution, the second lens barrel 21 uses a cylindrical structure, to reduce a space occupied by the second lens module 20. It should be understood that the lens barrel in the example in FIG. 7 is merely an example. When the second lens barrel 21 is specifically disposed, a structure of another shape, for example, a cylindroid shape or a square cylinder shape, may alternatively be used.

Figure 8:
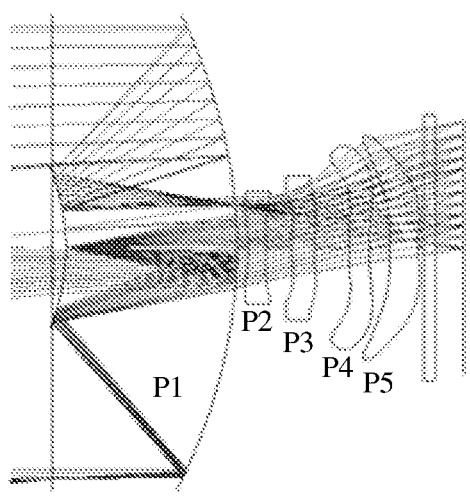
FIG. 8 is a schematic diagram of cooperation between a first lens module and a second lens module.

FIG. 8 is a schematic diagram of cooperation between a first lens module and a second lens module. FIG. 8 shows only a first lens P1, a second lens P2, a second lens P3, a second lens P4, a second lens P5, a filter (not marked in the figure), and an image signal processor (not marked in the figure). During propagation, light is incident from a light incident side surface of the first lens P1, is reflected by a second reflection region and a first reflection region, and is emergent from a light outgoing side surface of the first lens P1. The emergent light successively passes through the second lens P2, the second lens P3, the second lens P4, and the second lens P5. In this way, through the second lenses, an imaging focal length is adjusted, chromatic aberration, distortion, and aberration are reduced, imaging quality is adjusted and improved, and field of view curvature under each field of view is reduced. Then, the light is imaged on the image signal processor after passing through the filter. It can be seen from FIG. 8 that when the first lens module uses the first lens that can fold back a light path, a length of the lens module can be shortened. In addition, a volume and a weight are minimized, and costs are also reduced.

Figure 9:
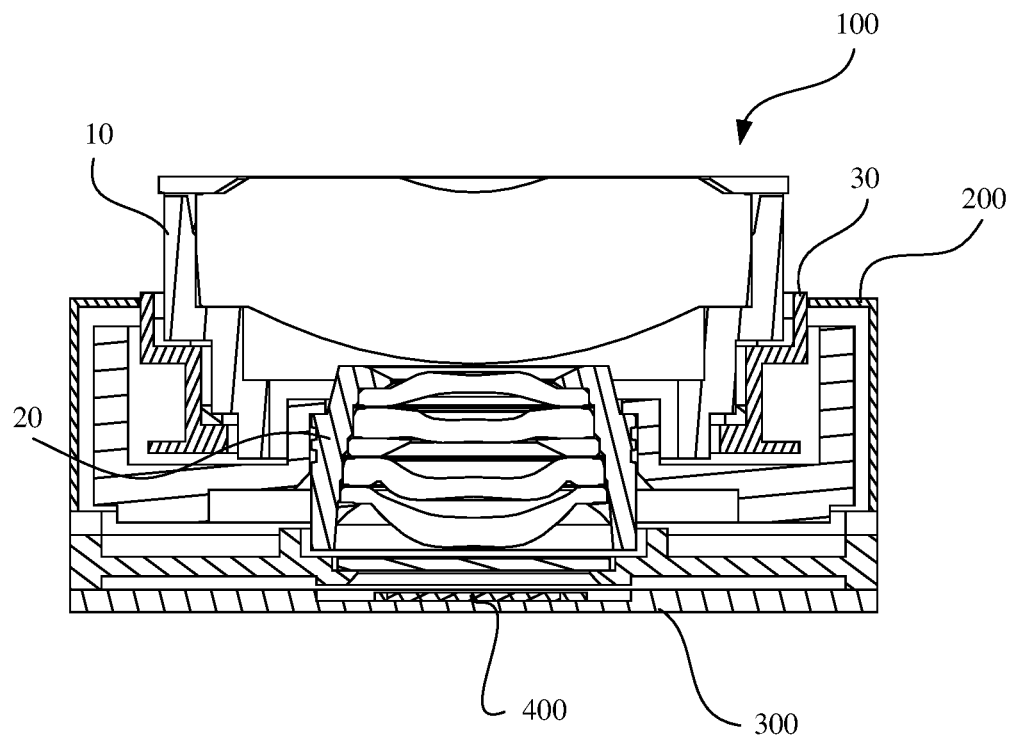
FIG. 9 is a schematic diagram of a structure application of a lens module according to an embodiment of this application.

FIG. 9 is a schematic diagram of a structure application of the lens module 100 according to an embodiment of this application. For reference numerals of some parts in FIG. 9, refer to reference numerals of the same parts in FIG. 2. When the lens module 100 is used in a camera module, the lens module 100 is fastened in the camera module. As shown in FIG. 9, the bracket 30 of the lens module 100 is located in a housing 200 of the camera module. The camera module further includes a circuit board 300 and an image signal processor 400 disposed on the circuit board 300. The image signal processor 400, the second lens module 20, and the first lens module 10 are arranged along the optical axis. During shooting, light may be irradiated to the image signal processor 400 after successively passing through the first lens and the second lens, so that the image signal processor 400 converts an optical signal into an electrical signal.

It can be seen from FIG. 9 that a light path is folded back after the lens module 100 provided in this embodiment of this application uses the first lens to refract the light. Therefore, the upright lens module 100 can also be used in the camera module, and a size of the camera module can be greatly reduced.

Figure 10:
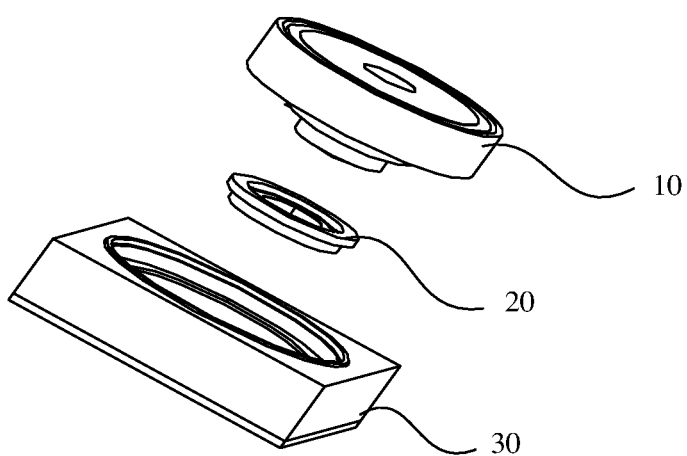
FIG. 10 is a schematic diagram of a structure of another lens module according to an embodiment of this application.

FIG. 10 is a schematic diagram of a structure of another lens module 100 according to an embodiment of this application. For reference numerals of some parts in FIG. 10, refer to reference numerals of the same parts in FIG. 2.

The lens module 100 shown in FIG. 10 includes a bracket 30, a first lens module 10, and a second lens module 20. For some parts in FIG. 10, refer to the same reference numerals in FIG. 2. A difference between the lens module 100 shown in FIG. 10 and both of the first lens module 10 and the second lens module 20 shown in FIG. 2 lies in a lens disposition manner.

Figure 11:
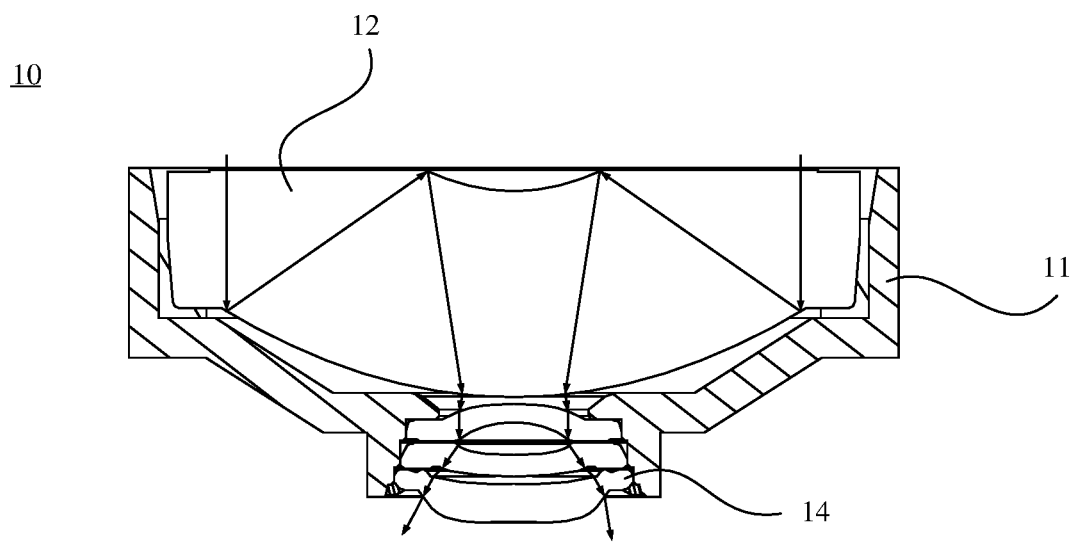
FIG. 11 is a sectional view of another first lens module according to an embodiment of this application.

FIG. 11 is a sectional view of the first lens module 10. The first lens module 10 includes a first lens barrel 11 and a first lens 12. For the first lens barrel 11 and the first lens 12, refer to the foregoing corresponding description. The first lens module 10 further includes a first lens barrel 11, and the first lens 12 is fastened in the first lens barrel 11. The first lens module 10 further includes at least one third lens 14, the first lens 12 and the at least one third lens 14 are arranged along an optical axis, and the at least one third lens 14 is located on an image side of the first lens 12. The at least one third lens 14 is a focusing lens. FIG. 10 shows three third lenses 14 as an example. However, a quantity of third lenses 14 in this embodiment of this application is not specifically limited herein.

In an optional solution, the first lens module 10 further includes a gasket. A spacing between the third lenses 14 may be adjusted by using the gasket, and a thickness of the gasket may be set based on an actual requirement.

Figure 12:
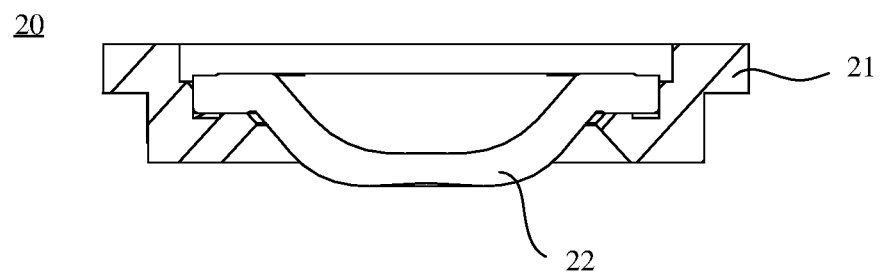
FIG. 12 is a sectional view of another second lens module according to an embodiment of this application.

FIG. 12 is a sectional view of the second lens module 20. The second lens module 20 includes a second lens barrel 21 and a second lens 22. There is one second lens 22, and the second lens 22 is fastened in the second lens barrel 21. The third lenses and the second lens 22 operate together to form a lens group that adjusts an imaging focal length, reduces chromatic aberration, distortion, and aberration, adjusts and improves imaging quality, reduces field of view curvature under each field of view, and ensures imaging quality on the image signal processor. The four lenses each may be a spherical lens or an aspherical lens as required. During specific disposition, a specific structure and a size of each lens are not specifically limited in this embodiment of this application, provided that the four lenses can implement focusing.

Figure 13:
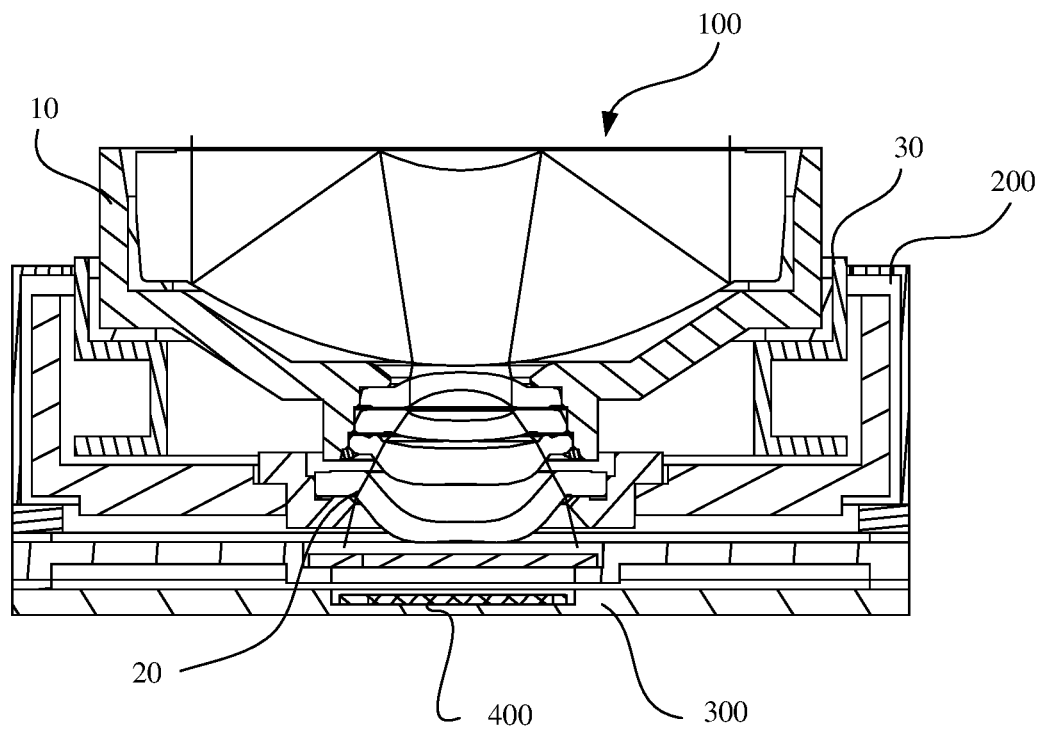
FIG. 13 is a schematic diagram of a structure application of a lens module according to an embodiment of this application.

FIG. 13 is a schematic diagram of a structure application of the lens module 100 according to an embodiment of this application. For reference numerals of some parts in FIG. 13, refer to reference numerals of the same parts in FIG. 2. When the lens module 100 is used in a camera module, the lens module 100 is fastened in the camera module. As shown in FIG. 13, the bracket 30 of the lens module 100 is located in a housing 200 of the camera module. The camera module further includes a circuit board 300 and an image signal processor 400 disposed on the circuit board 300. The image signal processor 400, the second lens module 20, and the first lens module 10 are arranged along the optical axis. During shooting, light may be irradiated to the image signal processor 400 after successively passing through the first lens and the second lens, so that the image signal processor 400 converts an optical signal into an electrical signal.

It can be seen from FIG. 13 that, after the lens module provided in this embodiment of this application uses the first lens to refract the light, a length of the lens module can be shortened. In addition, a volume and a weight are minimized, and costs are also reduced.

Figure 14:
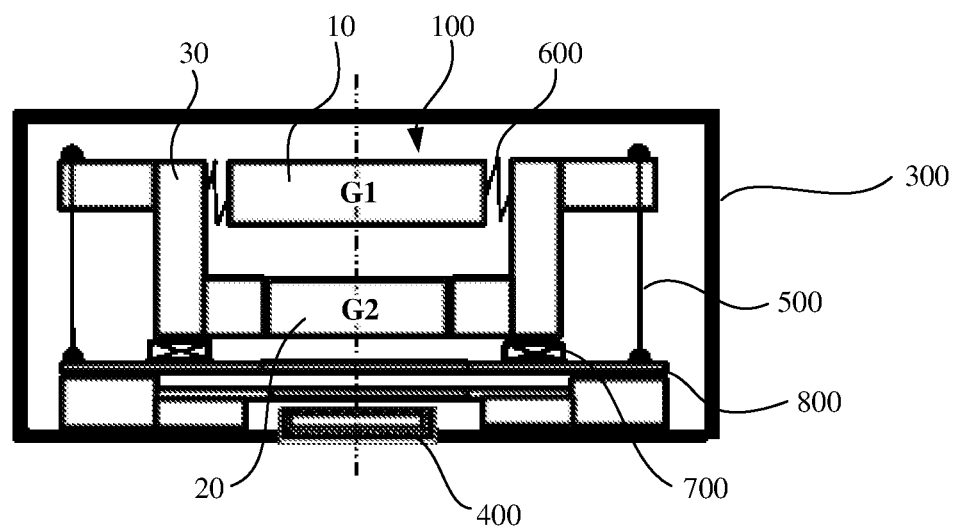
FIG. 14 is a schematic diagram of a structure of a camera module according to an embodiment of this application.

FIG. 14 is a schematic diagram of a structure of a camera module according to an embodiment of this application. For some reference numerals in FIG. 14, refer to the same reference numerals in FIG. 13. The camera module includes a base 800 and the lens module 100 that is in any one of the foregoing items and that is connected to the base 800.

The second lens module 20 is fixedly connected to the bracket 30, and the first lens module 10 is connected to the bracket 30 by using a first elastic member 600. The first lens module 10 and the second lens module 20 are sleeved in the bracket 30, the first lens module 10 is connected to the bracket 30 by using two or more first elastic members 600, and the second lens module 20 is fixedly connected to the bracket 30. In the foregoing structure, elastic deformation generated by the first elastic members 600 may enable the first lens to move along an optical axis, to adjust a relative position between the first lens module 10 and the second lens module 20, thereby implementing focusing.

A different driving mechanism may be selected to specifically drive the first lens module 10 to move. The driving mechanism is configured to drive the first lens module 10 to move, to implement focusing. For example, the driving mechanism may be an AF driving motor.

For ease of description, the first lens module 10 is named as a lens module G1, and the second lens module 20 is named as a lens module G2. A function of the AF driving motor is to implement focusing by moving the lens module G1 or the lens module G2 after the motor is energized, to implement clear imaging on the image signal processor. In FIG. 14, the movable lens module G1 is merely used as an example. The camera module provided in this embodiment of this application may alternatively use a fixed lens module G1, and the lens module G2 is connected to the bracket 30 by using an elastic member. In other words, focusing can be implemented, provided that at least one of the lens module G1 and the lens module G2 is movable.

When driving, the AF driving motor calculates a lens movement distance based on a Hall sensor signal, a driver chip, or a gyroscope signal. The driver chip calculates the relative position between the lens module G1 and the lens module G2 based on a specific algorithm, to implement clear imaging. In an optional solution, the AF driving motor may be implemented by using a voice coil motor, a piezoelectric motor, or a shape memory alloy wire. It should be understood that a manner of driving the first lens module 10 based on the Hall sensor signal, a driving IC, or the gyroscope signal is a relatively common driving manner. Details are not described herein again.

The lens module 100 provided in this embodiment of this application further has an image stabilization function. As shown in FIG. 14, the base 800 is connected to the bracket 30 by using a third elastic member 500, and the camera module further includes an image stabilization motor 700 that compensates for jittering of the lens module 100. An image stabilization effect of the camera module is improved through cooperation between the third elastic member 500 and the image stabilization motor 700. The third elastic member 500 may be a spring or a suspension wire, and the third elastic member 500 enables the lens module 100 to form a suspended elastic structure. It should be understood that, although two third elastic members 500 are shown in FIG. 14, in this embodiment of this application, a plurality of third elastic members 500 may be disposed, for example, two, three, or four third elastic members 500 may be disposed, provided that the bracket 30 can be supported.

The image stabilization motor 700 may use an OIS (optical image stabilization) motor. The OIS motor drives, by using a magnetic field generated by a magnet (not shown in the figure) at a bottom of the bracket 30 and a Lorentz force generated by energizing an electromagnet on the base 800, the third elastic member 500 to displace, to implement image stabilization of the entire lens module group during movement. After a gyroscope in the camera module detects slight lens movement, the gyroscope transmits a signal to a microprocessor, the microprocessor immediately calculates, based on a jittering direction and displacement, a displacement amount that needs to be compensated for, and then the OIS motor drives the lens module G1 and the lens module G2 to move to compensate for the displacement amount, thereby effectively overcoming an image blur generated through camera vibration. The OIS motor may be in a form of a voice coil motor, a piezoelectric motor, or a shape memory alloy, to implement image stabilization displacement compensation. A structure and an operation principle of the image stabilization motor 700 are implemented in relatively common driving manners. Details are not described herein again.

The camera module for long-focus shooting has a high requirement for precise of a focusing position. A driving motor of the lens module G1 needs to sense a position of the lens module by using a Hall sensor, to implement closed-loop control. In addition, a motion state needs to be sensed by using a gyroscope signal on the module, and a jittering amount is compensated for through software algorithm calculation, to implement OIS image stabilization.

It can be learned from the foregoing description that the camera module performs AF (auto focus) focusing by axially moving the lens module G1, to implement a good imaging effect of a near object distance (for example, implement imaging from 1.0 meter to an infinite distance). The lens module G2 is fastened to the bracket 30, and does not need to move in an optical axis direction. During shooting, the lens module G1 is driven by the AF motor to implement focusing and imaging. A structure of the camera module is relatively simple, a control manner is easy to implement, and costs are advantageous.

Figure 15:
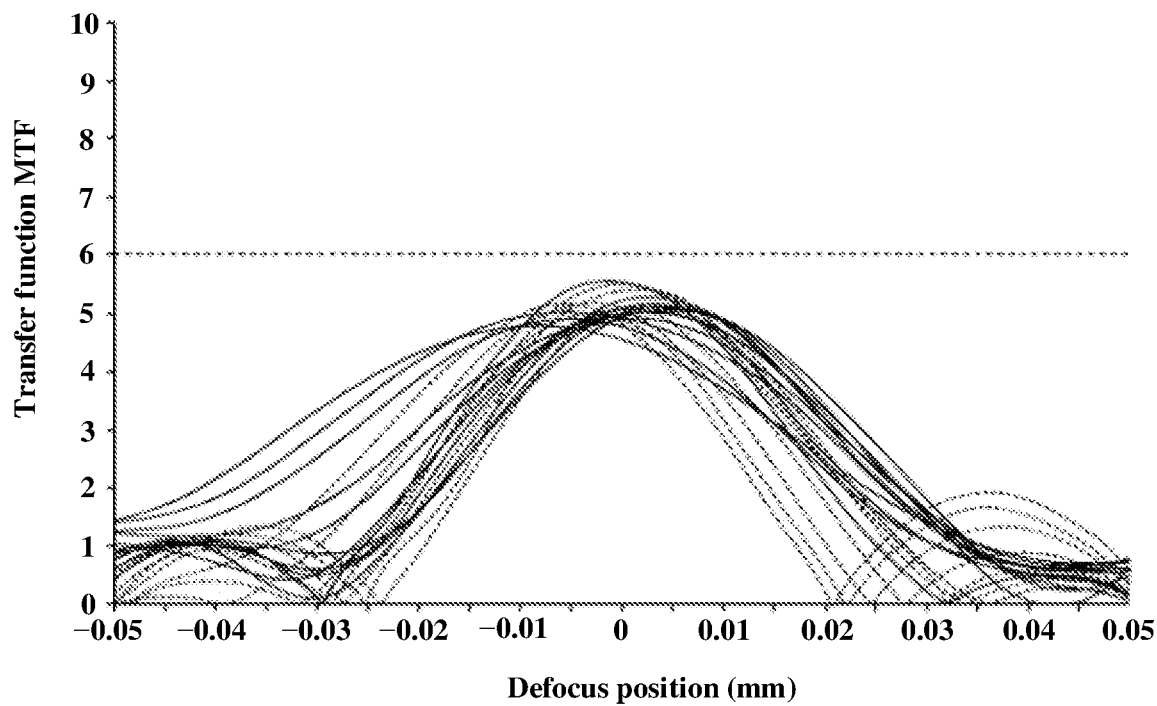
FIG. 15 is a schematic diagram of a simulation result of a camera module according to an embodiment of this application.

The lens module implements focusing by combining and matching two lens modules, to implement a long-focus shooting effect of more than five folds on a mobile phone module. For ease of understanding of effect of the camera module provided in this embodiment of this application, the camera module is simulated. A simulation result is shown in FIG. 15. It can be seen from FIG. 15 that when the camera module shown in FIG. 14 is used for simulation, an MTF value of an imaging effect under a 0.8 field of view reaches 55, and field of view curvature is significantly improved.

In addition, the OIS motor and the AF driving motor can be separately controlled, thereby improving a control effect.

Figure 16:
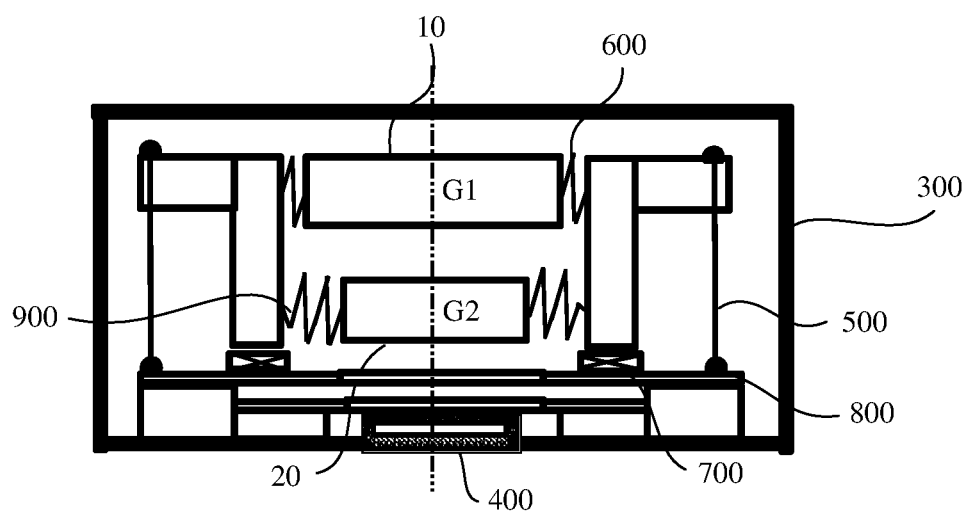
FIG. 16 is a schematic diagram of a structure of another camera module according to an embodiment of this application.

FIG. 16 is a schematic diagram of a structure of another camera module. For some parts in FIG. 16, refer to the same reference numerals in FIG. 14. In the camera module shown in FIG. 16, both the first lens module 10 and the second lens module 20 are connected to the bracket 30 in a suspended manner. Specifically, the first lens module 10 is connected to the bracket 30 by using a first elastic member 600, and the second lens module 20 is connected to the bracket 30 by using a second elastic member 900.

For ease of description, the first lens module 10 is named as a lens module G1, and the second lens module 20 is named as a lens module G2. In this embodiment, the lens module G1 and the lens module G2 are separately suspended on the bracket 30 by using the elastic members, so that both the lens module G1 and the lens module G2 can move. When a distant scenery is photographed, an optimal matching distance between the lens module G1 and the lens module G2 is calculated based on an algorithm, to implement imaging and focusing, thereby achieving an imaging effect of higher quality. Similarly, image field curvature under different fields of view can be reduced, and a focusing manner for picture imaging quality is improved. In this architecture, the lens module G1 and the lens module G2 are driven by a separate voice coil motor or another motor (a shape memory alloy wire or a piezoelectric motor), to move along an optical axis.

The OIS motor drives, by using a magnetic field generated by a magnet at a bottom of the bracket 30 and a Lorentz force generated by energizing a coil on the base, four or more springs or suspension wires to displace, to implement image stabilization of the entire lens module group during movement.

Both the lens module G2 and the lens module G1 are driven by motors to displace, and closed-loop control is implemented on the lens module G1 and the lens module G2 by using two independent control motors. The lens module G1 and the lens module G2 respectively adjust focusing distances based on a focusing algorithm along the optical axis during shooting, to operate together and match and combine with each other to implement an AF function. For example, the lens module G1 performs AF to implement rough focusing, and the lens module G2 performs axial AF movement to implement fine focusing. This can reduce a requirement of an optical element for precise of a position of the motor, and more easily implement a good imaging effect of a near object distance (implement imaging from 1.0 meter to an infinite distance).

In addition, two elastic members are used to reduce assembly difficulty of a complex assembly process, and mass production is easy to implement. In addition, the lens module G1 and the lens module G2 are connected to the bracket 30 by using the elastic members, to more easily implement displacement with a fast response speed.

Figure 17:
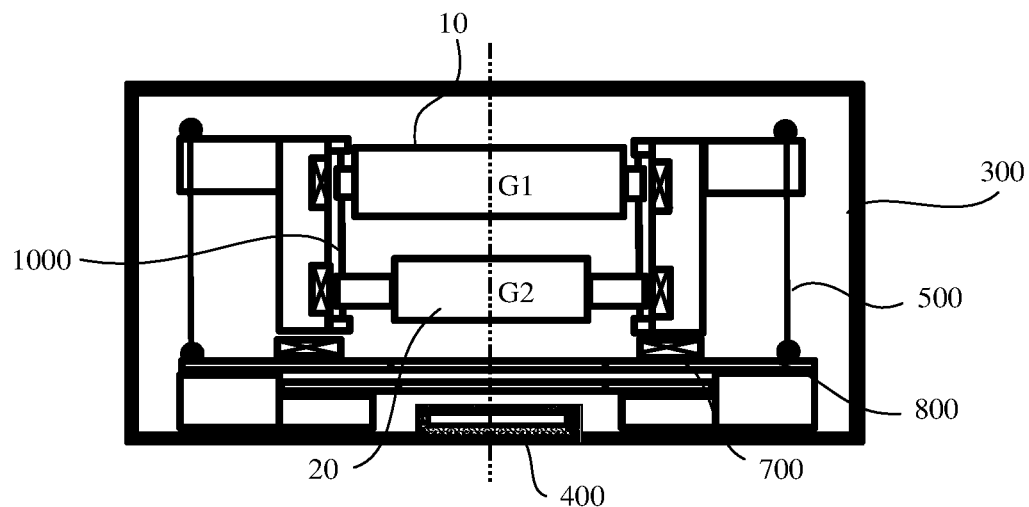
FIG. 17 is a schematic diagram of a structure of another camera module according to an embodiment of this application.

FIG. 17 is a schematic diagram of another type of specific cooperation between the bracket 30 and both of the first lens module 10 and the second lens module 20. For some parts in FIG. 17, refer to the same reference numerals in FIG. 14. In the camera module shown in FIG. 17, both the first lens module 10 and the second lens module 20 are connected to the bracket 30 in a suspended manner. A difference between the camera module shown in FIG. 17 and the camera module shown in FIG. 14 lies in that a shaft 1000 extending in a direction of an optical axis 1000 is disposed in the bracket 30 when the first lens module 10 and the second lens module 20 are connected to the bracket 30, and the first lens module 10 and the second lens module 20 are separately slidably assembled on the shaft 1000. When a distant scenery is photographed, an optimal matching distance between the lens module G1 and the lens module G2 is calculated based on an algorithm, to implement imaging and focusing, thereby achieving an imaging effect of higher quality. Therefore, image field curvature under different fields of view can be reduced, and a focusing manner for picture imaging quality is improved. In this architecture, the lens module G1 and the lens module G2 are driven by a separate voice coil motor or another motor (an SMA or a piezoelectric motor), to move along the optical axis 1000.

The image stabilization motor 700 is the same as those in the camera modules shown in FIG. 14 and FIG. 16, and drives, by using a magnetic field generated by a magnet at a bottom of the bracket 30 and a Lorentz force generated by energizing an electromagnet on the base 800, four or more springs or suspension wires to displace, to implement image stabilization of the entire lens module group during movement.

This embodiment is further optimized based on an upright refractive architecture, so that closed-loop control is implemented on the lens module G1 and the lens module G2 by using two independent control motors. The lens module G1 and the lens module G2 respectively adjust focusing distances based on a focusing algorithm along the optical axis during shooting, to operate together and match and combine with each other to implement an AF function. For example, the lens module G1 performs AF to implement rough focusing, and the lens module G2 performs axial AF movement to implement fine focusing. This can reduce a requirement of an optical element for precise of a position of the motor, and more easily implement a good imaging effect of a near object distance.

In addition, both the lens module G1 and the lens module G2 participate in focusing. Therefore, a requirement for repeatability precise of lens position hardware detection is reduced, and position control precise is easily implemented by using an existing Hall sensor hardware detection circuit without using a high-precise position detection element with higher difficulty, for example, a TMR.

When both the lens module G1 and the lens module G2 participate in focusing, an imaging effect under each field of view is greatly improved, and in particular, field of view curvature is greatly improved.

The lens module G1 and the lens module G2 move on the sliding shaft for focusing, to effectively eliminate eccentricity, and effectively eliminate optical axis deviation.

Figure 18:
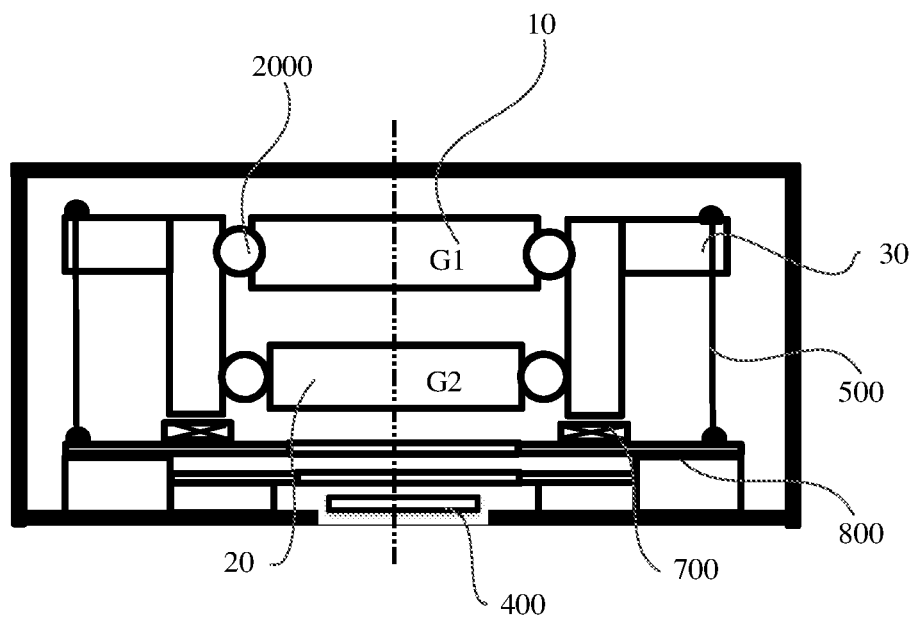
FIG. 18 is a schematic diagram of a structure of another camera module according to an embodiment of this application.

FIG. 18 is a schematic diagram of another type of specific cooperation between the bracket 30 and both of the first lens module 10 and the second lens module 20. For some parts in FIG. 18, refer to the same reference numerals in FIG. 14. In the camera module shown in FIG. 18, the first lens module 10 and the second lens module 20 each are connected to the bracket 30 by using a ball motor. The ball motor includes a chute disposed on the bracket, and a length direction of the chute is parallel to an optical axis. A ball 2000 assembled on each of the first lens module 10 and the second lens module 20 in a rolling manner can roll in the chute, an electromagnet is further disposed in the bracket, and a permanent magnet is disposed in each of the first lens module and the second lens module. The electromagnet and the permanent magnet operate to drive each of the first lens module 10 and the second lens module 20 to move along the optical axis, and the ball 2000 matches with the chute to limit a motion direction of each of the first lens module and the second lens module.

When a distant scenery is photographed, an optimal matching distance between the lens module G1 and the lens module G2 is calculated based on an algorithm, to implement imaging and focusing, thereby achieving an imaging effect of higher quality. Therefore, image field curvature under different fields of view can be reduced, and a focusing manner for picture imaging quality is improved.

The image stabilization motor 700 is the same as those in the camera modules shown in FIG. 14 and FIG. 16, and drives, by using a magnetic field generated by a magnet at a bottom of the bracket 30 and a Lorentz force generated by energizing an electromagnet on the base 800, four or more springs or suspension wires to displace, to implement image stabilization of the entire lens module group during movement.

This embodiment is further optimized based on an upright refractive architecture, so that closed-loop control is implemented on the lens module G1 and the lens module G2 by using two independent control motors. The lens module G1 and the lens module G2 respectively adjust focusing distances based on a focusing algorithm along the chute during shooting, to operate together and match and combine with each other to implement an AF function. For example, the lens module G1 performs AF to implement rough focusing, and the lens module G2 performs axial AF movement to implement fine focusing. This can reduce a requirement of an optical element for precise of a position of the motor, and more easily implement a good imaging effect of a near object distance.

In addition, both the lens module G1 and the lens module G2 participate in focusing. Therefore, a requirement for repeatability precise of lens position hardware detection is reduced, and position control precise is easily implemented by using an existing Hall sensor hardware detection circuit without using a high-precise position detection element with higher difficulty, for example, a TMR.

When both the lens module G1 and the lens module G2 participate in focusing, an imaging effect under each field of view is greatly improved, and in particular, field of view curvature is greatly improved.

The lens module G1 and the lens module G2 move on the sliding shaft for focusing, to effectively eliminate eccentricity, and effectively eliminate optical axis deviation.

It can be learned from the foregoing description that, in this embodiment of this application, different focusing structures may be used to implement focusing of the lens module. In addition, the third elastic member connects the lens module to the camera module, and then cooperates with the image stabilization motor, to implement an image stabilization effect.

An embodiment of this application further provides a terminal. The terminal may be a common terminal, for example, a mobile phone, a tablet computer, or a notebook computer. However, regardless of which terminal is used, the terminal includes a housing and the camera module that is in any one of the foregoing items and that is disposed in the housing. In the foregoing technical solution, a light path is folded back through the first lens, to implement effect of a long-focus lens module. In addition, because the light path is folded back, an upright lens module with a small size may be used, and a size of the camera module is reduced, so that the camera module can adapt to thinning development of the terminal.

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A lens module, comprising a first lens module and a second lens module that are arranged along an optical axis;
    the first lens module comprises a first lens, a light incident side surface of the first lens comprises a light transmission region and a first reflection region, a light outgoing side surface of the first lens comprises a second reflection region and a light outgoing region, and the first reflection region and the second reflection region are configured to refract light incident into the first lens from the light transmission region, so that the light is incident into the second lens module through the light outgoing region in an optical axis direction; and
    the second lens module comprises a second lens, the second lens and the first lens are arranged along the optical axis, and the second lens is a focusing lens,
    wherein the lens module further comprises a bracket, the bracket supports the first lens module and the second lens module, and at least one of the first lens module and the second lens module is configured to slide relative to the bracket in the optical axis direction.

2. The lens module according to claim 1, wherein the first reflection region is located at a center position of the light incident side surface, and the light transmission region surrounds the first reflection region; and
    the light outgoing region is located at a center position of the light outgoing side surface, and the second reflection region is disposed around the light outgoing region.

3. The lens module according to claim 2, wherein the light transmission region is a planar region; and the first reflection region is a concave spherical region.

4. The lens module according to claim 2, wherein the light outgoing side surface is a convex spherical surface.

5. The lens module according to claim 1, wherein a reflection film layer is separately attached to the first reflection region and the second reflection region, and a reflective surface of the reflection film layer attached to the first reflection region and a reflective surface of the reflection film layer attached to the second reflection region each faces an inner part of the first lens.

6. The lens module according to claim 1, wherein the first lens module further comprises a first lens barrel, and the first lens is arranged in the first lens barrel; and
    the second lens module further comprises a second lens barrel, and the second lens is arranged in the second lens barrel.

7. The lens module according to claim 6, wherein the first lens module further comprises at least one third lens arranged in the first lens barrel, the at least one third lens and the first lens are arranged along the optical axis, the at least one third lens is located between the first lens and the second lens module, and the at least one third lens is a focusing lens.

8. The lens module according to claim 7, wherein the at least one third lens comprises three third lenses.

9. The lens module according to claim 8, wherein the first lens module further comprises a gasket, and the gasket is located between two adjacent third lenses of the three third lenses.

10. The lens module according to claim 6, wherein the first lens module further comprises a cover plate; and
    an opening is disposed at each of two ends of the first lens barrel, the cover plate is configured to be arranged on the opening at one end of the first lens barrel.

11. The lens module according to claim 10, wherein an inner wall of the first lens barrel is in a stepped shape of which a size gradually decreases in a direction from a first end to a second end, the first end is one end that is of the first lens barrel and the first lens is located between the first end and the second lens module, and the second end is one end that is of the first lens barrel and the second end is located between the first lens and the second lens module; and
    the first lens is arranged at a position that is in the first lens barrel and that is close to the first end, and the cover plate is configured to be arranged on the first end of the first lens barrel.

12. The lens module according to claim 6, wherein the second lens module comprises a plurality of second lenses arranged in the second lens barrel.

13. The lens module according to claim 12, wherein the plurality of second lenses comprises four second lenses.

14. The lens module according to claim 12, wherein the second lens module further comprises a gasket, and the gasket is located between two adjacent second lenses of the four lenses.

15. The lens module according to claim 6, wherein an inner wall of the second lens barrel is in a stepped shape of which a size gradually increases in a direction from a third end to a fourth end, the third end is one end that is of the second lens barrel and the third end is located between the first lens module and the second lens, and the fourth end is one end that is of the second lens barrel and the second lens is located between the first lens module and the fourth end.

16. The lens module according to claim 1, wherein the second lens module is fixedly connected to the bracket, and the first lens module is connected to the bracket by using a first elastic member.

17. The lens module according to claim 16, wherein the lens module further comprises a driving mechanism configured to drive the first lens module to move in the optical axis direction.

18. A camera module, comprising a base and a lens module that is connected to the base; wherein the lens module comprises a first lens module and a second lens module that are arranged along an optical axis;
the first lens module comprises a first lens, a light incident side surface of the first lens comprises a light transmission region and a first reflection region, a light outgoing side surface of the first lens comprises a second reflection region and a light outgoing region, and the first reflection region and the second reflection region are configured to refract light incident into the first lens from the light transmission region, so that the light is incident into the second lens module through the light outgoing region in an optical axis direction; and
the second lens module comprises a second lens, the second lens and the first lens are arranged along the optical axis, and the second lens is a focusing lens,
wherein the lens module further comprises a bracket, the bracket supports the first lens module and the second lens module, and at least one of the first lens module and the second lens module is configured to slide relative to the bracket in the optical axis direction.

19. A terminal, comprising a housing and a camera module and that is disposed in the housing; wherein the camera module comprises a base and a lens module that is connected to the base; wherein the lens module comprises a first lens module and a second lens module that are arranged along an optical axis;
the first lens module comprises a first lens, a light incident side surface of the first lens comprises a light transmission region and a first reflection region, a light outgoing side surface of the first lens comprises a second reflection region and a light outgoing region, and the first reflection region and the second reflection region are configured to refract light incident into the first lens from the light transmission region, so that the light is incident into the second lens module through the light outgoing region in an optical axis direction; and
the second lens module comprises a second lens, the second lens and the first lens are arranged along the optical axis, and the second lens is a focusing lens,
wherein the lens module further comprises a bracket, the bracket supports the first lens module and the second lens module, and at least one of the first lens module and the second lens module is configured to slide relative to the bracket in the optical axis direction.

20. A lens module, comprising a first lens module and a second lens module that are arranged along an optical axis;
the first lens module comprises a first lens, a light incident side surface of the first lens comprises a light transmission region and a first reflection region, a light outgoing side surface of the first lens comprises a second reflection region and a light outgoing region, and the first reflection region and the second reflection region are configured to refract light incident into the first lens from the light transmission region, so that the light is incident into the second lens module through the light outgoing region in an optical axis direction; and
the second lens module comprises a second lens, the second lens and the first lens are arranged along the optical axis, and the second lens is a focusing lens,
wherein the first lens module further comprises a first lens barrel, and the first lens is arranged in the first lens barrel; and
the second lens module further comprises a second lens barrel, and the second lens is arranged in the second lens barrel, and
wherein the first lens module further comprises a cover plate; and
an opening is disposed at each of two ends of the first lens barrel, the cover plate is configured to be arranged on the opening at one end of the first lens barrel.

* * * * *